Sept. 17, 1963 F. B. DOYLE 3,103,951
NON-FREEZING EXPANSION VALVE
Filed Aug. 17, 1960 3 Sheets-Sheet 1
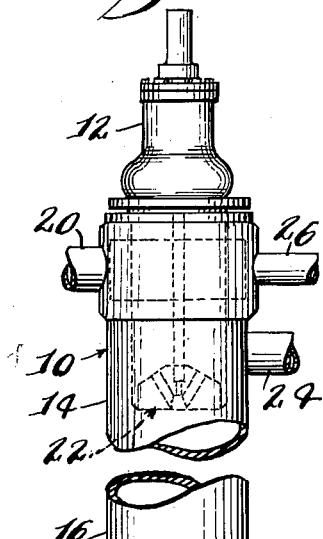
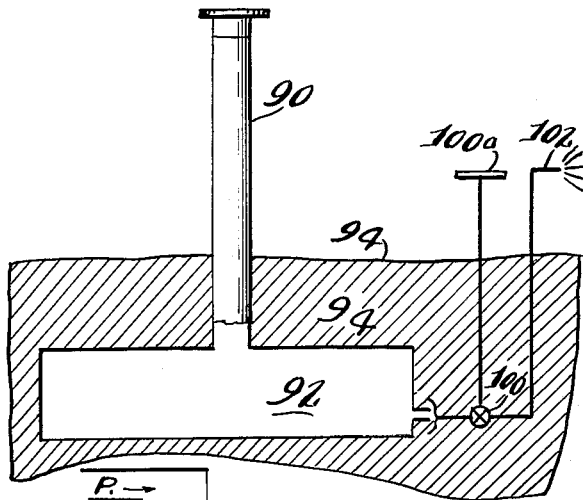
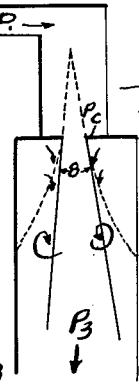
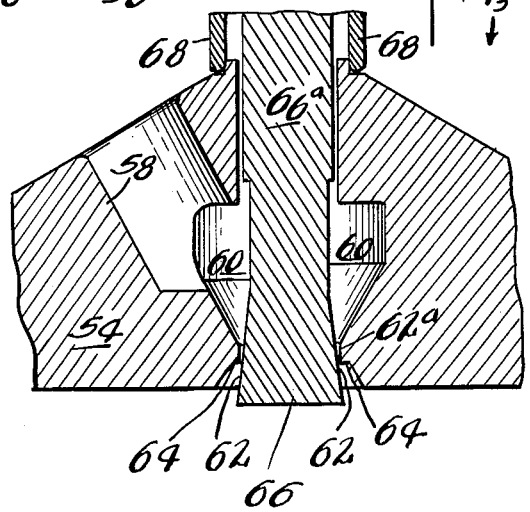
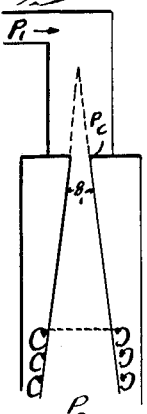
Inventor.
Frank B. Doyle.
By George E. Frost.
Attorney.

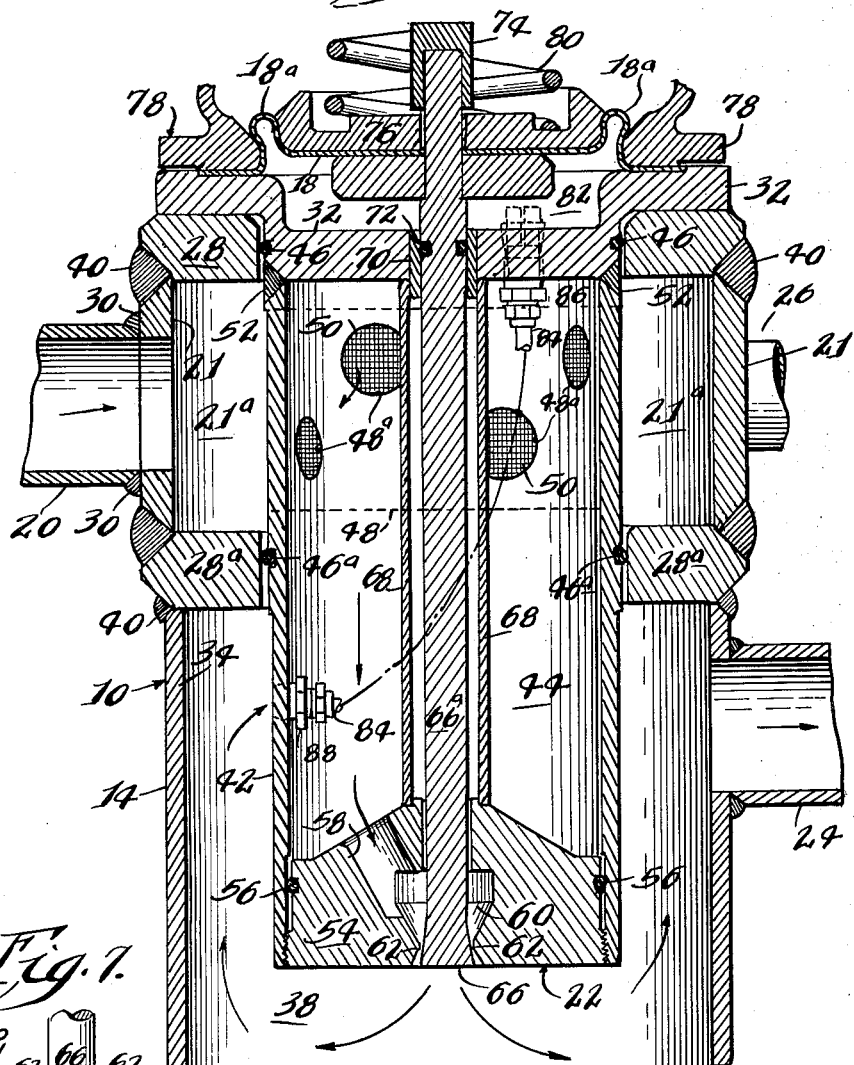
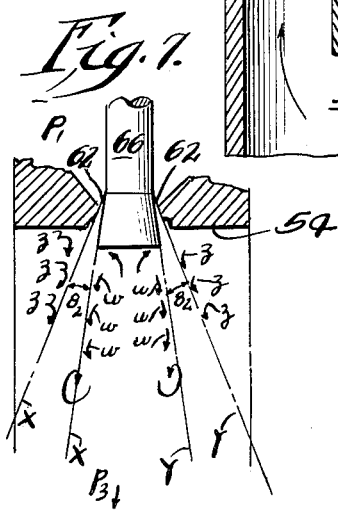

Sept. 17, 1963 F. B. DOYLE 3,103,951
NON-FREEZING EXPANSION VALVE
Filed Aug. 17, 1960 3 Sheets-Sheet 3

INVENTOR.
Frank B. Doyle
BY
Frost & Vandenburgh
Attys

United States Patent Office 3,103,951
Patented Sept. 17, 1963

1

3,103,951
NON-FREEZING EXPANSION VALVE
Frank B. Doyle, Box 255, Raymond, Ill.
Filed Aug. 17, 1960, Ser. No. 50,557
7 Claims. (Cl. 137—505.29)

My invention relates to a non-freezing expansion valve particularly adapted for expanding natural gas from a relatively high pressure conduit to a low pressure conduit without freezing.

This application is a continuation-in-part of my prior application Serial No. 772,543, filed November 7, 1958, now abandoned.

Expansion valves for gas reduce the pressure of incoming gas to a predetermined value for various uses. The pressure at the outlet side of the valve is sensed to control the valve action and maintain essentially constant discharge pressure by varying the degree of valve opening. Such valves consist of a movable valve member which cooperates with an orifice to control the passage of gas and thereby maintain the desired discharge pressure.

The natural gas is piped from the gas fields to various cities, towns and hamlets. An attempt is made at the fields to dehydrate the gas but the gas retains a slight amount of moisture. Furthermore, the actual dehydration may be substantially less effective at times than is intended. Many of the small towns are provided with small, unheated and unmanned reduction stations in the interests of economy. These stations house the expansion valves above described and afford little protection against the elements, especially cold weather. The gas under high pressure at the inlet side of the expansion valves is reduced to a low pressure by passing through a control orifice. Energy is needed to lower the pressure of the gas and this energy takes the form of a drop in the temperature of the gas. This temperature drop tends to condense the moisture in the gas into water, which in turn may frost or become ice. The frost and ice coat the operative elements of the reduction valve, thereby interfering with the operation of the same.

In addition to interfering with the operation of the mechanical parts, it is not uncommon for ice actually to block the expansion orifice and restrict or prevent the flow of gas therethrough. In such a case the gas supplier "loses a town," i.e. the town has no gas supply. The restoration of gas service in such an instance is a complicated and costly operation.

It has long been recognized that natural gas, for example, such as the present invention was devised to handle, does not act as a perfect gas as it passes through an orifice. The Joule-Thomson coefficients must be taken into consideration. The fact is that upon losing its velocity after passing through an orifice, the gas does not return to the temperature that it had at the high pressure side of the orifice before its velocity was increased. See, for example, Thermodynamics Fluid Flow and Heat Transmission, H. O. Croft, p. 70 (1938). The facts that the gas is very cold as its velocity increases on the high pressure side of the valve, becomes extremely cold when its velocity is the greatest through the orifice, and continues to be cold in the portions of the valve downstream from the orifice, have resulted in valves that will freeze in cold weather and have lead those skilled in the art to conclude that the only solution was to heat the high pressure gas in a heat exchanger when the ambient temperatures were low. Surprisingly enough, I have discovered that despite these well recognized and apparently insurmountable operating facts, it is possible to construct a pressure-regulating valve which does not "freeze up" even when operating through the winter temperatures in the Great Plains of the United States without being heated.

In the absence of a heated room within which to locate the valve, the usual practice is to heat the valve per se. This, of course, requires the cost of a heating fuel. In addition, some supervision is necessary to make sure that the heater does not go out and the valve thereafter freeze.

In the present invention the valve is so constructed that no water or ice will accumulate at the orifice. In the first place, the portions of the valve over which the gas flows at high velocity are so constructed that they do not become as cold as do the corresponding structures of valves of the conventional type, and the high velocity gas acts to sweep any condensation, in the form of water, snow or ice, clear of the operating portions of the valve. In addition, immediately after passing through the orifice, the high velocity gas is turbulently mixed with gas already rewarmed by a reduction in its velocity so that there is an interchange of heat between the two. Thus, there is not a concentration of the extremely cold high velocity gas on the valve body walls downstream of the orifice.

The valve orifice has an annular shoulder immediately downstream its seat portion which opens into an expansion chamber. The annular shoulder presents a sharp enlargement in cross-section to the gas in relation to the cross-section of the throat of the orifice. The sharp enlargement causes turbulence in the gas flow which creates heat and which sucks in the low velocity gas in the expansion chamber. Thus, the bottom of the orifice is washed by "warm" (low velocity) gas which minimizes the tendency of the valve parts to freeze. This increase in temperature is conducted to other valve parts and is instrumental in raising the temperature of the gas in the expansion chamber.

It is a general object of the present invention to provide an improved non-freezing gas expansion valve.

It is another object of the present invention to provide an improved non-freezing gas expansion valve in which the conformations of the gas discharge orifice permit a turbulent gas flow that tends to prevent the formation of frost and ice.

It is still a further object of the present invention to provide an improved non-freezing gas expansion valve in which the gas rushing through the control orifice blows ice and water out of the gas stream.

It is yet another object of the present invention to provide an improved non-freezing gas expansion valve with a gas discharge orifice having an inwardly extending annular lip and a sharp enlargement downstream of the lip which produces turbulence in the gas as it flows by to generate heat.

It is a further object of the invention to provide an improved non-freezing gas expansion valve in which the absolute minimum portion of the valve operating member is exposed to the extremely cold gas and having provisions for maintaining adjacent portions of that member at a higher temperature to warm that minimum portion by conduction.

It is an object of my invention to provide a valve with a valve seat positioned just upstream from an expansion chamber with the valve stem and member forming the valve seat defining an orifice of gradually increasing size from said valve seat downstream to said chamber to achieve stability of valve operation and ameliorate the conditions that result in the freezing of expansion valves of the conventional type.

Still another object of the present invention is to provide an improved gas pressure control valve in which the gas flow past the thermally conductive valve parts serves to minimize the temperature of the parts at the pressure-controlling orifice.

The novel features which I believe to be characteristic of my invention are set forth with particularity in the appended claims. My invention, together with further objects and advantages thereof, will best be understood by references to the following description taken in conjunction with the accompanying drawings in which:

FIGURE 1 is a fragmentary side elevational view of a non-freezing expansion valve with associated elements made in accordance with the present invention;

FIGURE 2 is an axial cross-sectional view of the valve of FIGURE 1;

FIGURE 3 is a greatly enlarged view of the gas discharge orifice as seen in FIGURE 2 with the valve in partially opened condition;

FIGURE 4 is a diagrammatic view of the condensate tank and water discharge mechanism which may be used with the present invention;

FIGURES 5-7 are diagrammatic views showing the mode of gas discharge through a conventional step orifice (FIGURE 5), an orifice with a divergent cone (FIGURE 6) and the special orifice of the present invention (FIGURE 7);

Figure 8:
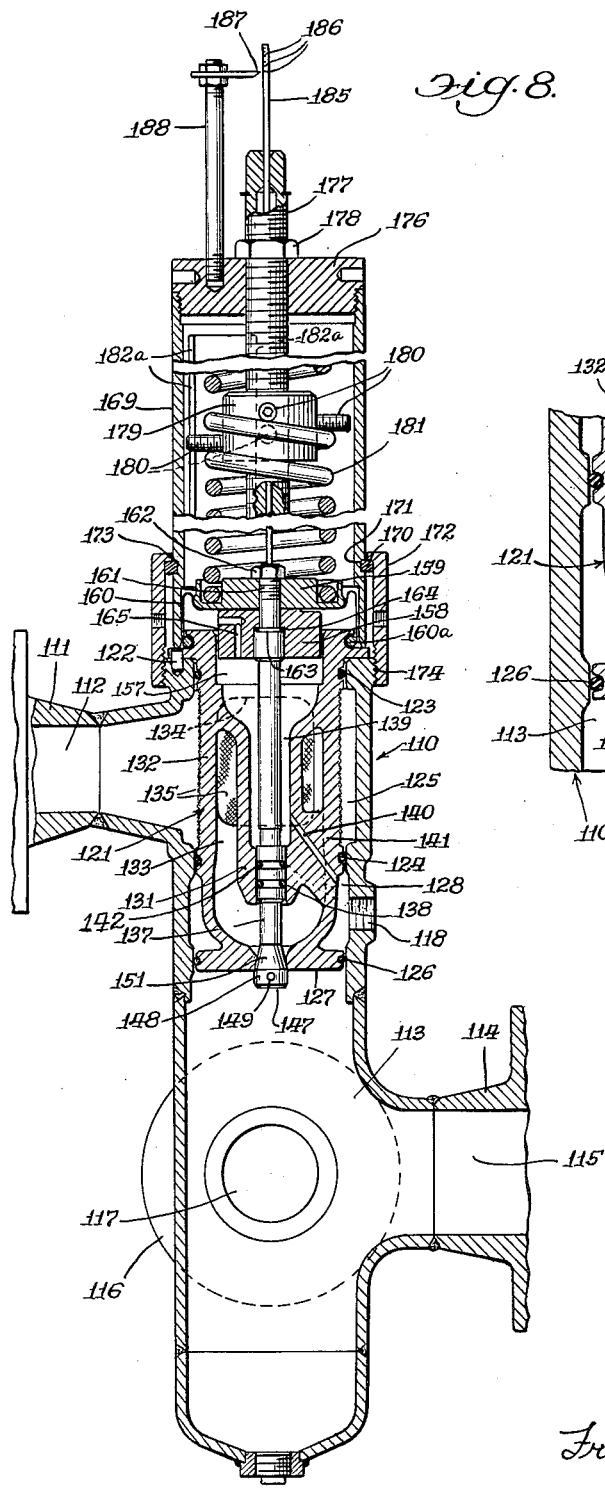
FIGURE 8 is a sectional view of another embodiment.

There is shown generally at 10, FIGURES 1 and 2, a non-freezing expansion valve for gas made in accordance with the present invention. The unit consists of bell portion 12, orifice portion 14 and expansion chamber 16. The bell portion contains the elements which automatically react to the demand of gas users, preferably a diaphragm 18 which will be described in more detail hereinafter. The orifice portion contains gas inlet pipe 20, the gas discharge orifice shown generally at 22, FIGURES 1 to 3, and gas outlet pipe 24. A number of pipes containing testing instruments—such as a thermometer, flow indicator, etc.—may also extend from orifice portion 14. One such pipe is depicted at 26. The expansion chamber 16 is an elongated cylinder which allows the gas to expand in volume after travelling through the orifice 22, and its function will be discussed in more detail hereinafter.

Referring now to FIGURE 2, gas inlet pipe 20 is welded to top wall pipe 21 at 30. The plug 28 is received in a bore defined by plate 32 and wall 34 of gas outlet chamber 38. The plug 28 is welded to pipe 21 at 40. The plug 28 terminates at walls 42 of gas inlet chamber 44 and is sealed against leakage by O ring 46. A dust collecting screen 48 is wrapped about sleeve 42 as shown to cover the openings 50 of the sleeve 42 and filter gas passing from the inlet or high pressure chamber 21a into chamber 44. Inlet chamber 21a is defined on its bottom end by the plug 28a which is welded to sleeve 21 as shown and is sealed against leakage with respect to sleeve 42 by O ring 46a.

The chamber 44 is defined by cylindrical walls 42, gas discharge orifice 22 and plate 32. The latter serves to isolate the diaphragm elements from the high pressure of incoming gas. Walls 42 are welded to plate 32 at 52 at one end and threadedly receives gas discharge orifice 22 at the other end as seen in FIGURE 2. It is apparent that gas flowing into chamber 44 has only one outlet, that provided by gas discharge orifice 22.

Referring now to FIGURES 2 and 3, gas discharge orifice, generally noted at 22, is in the form of a plug 54 which is threadedly received in walls 42 of inlet gas chamber 44 and which is sealed against leakage by O ring 56. On the inlet side of plug 54 there are a number of bores 58 which extend into an annular space 60. The space 60, which is substantially conical in conformation, decreases in cross-section as the gas moves downstream and terminates at the upstream edge of an annular lip 62. The lip 62 extends a small distance downstream (⅛ of an inch is a practical value) and is sharply terminated by horizontal shoulder 64 as best seen in FIGURE 3. The shoulder 64 defines the beginning of the outlet side of gas discharge orifice 22 and expands into a conical shaped annular space of increasing cross-section.

A valve stem 66 of conical conformation mates with the annular lip to define an annular control space 62a between the surfaces of the lip 62 and the valve stem 66. The stem 66 is part of a shaft 66a which extends the axial length of orifice portion 14 and terminates in the bell portion 12 of the non-freezing expansion valve 10. The shaft 66a is slidably received in sleeve 68 and bearing bushing 70. Sleeve 68 extends the axial length of gas inlet chamber 44 and seats against plug 54 at one end and plate 32 at the other end. Sleeve 70 has a press and leak-proof fit in plate 32 and extends slightly beyond the width of plate 32 and seals off the diaphragm 18 from gas which may have leaked into the confines of sleeve 68 through means of O ring 72 which fits around shaft 66a as shown in FIGURE 2.

The lower end of shaft 66a is slidably received in plug 54 of gas discharge orifice 22. The other end of shaft 66a is threadedly received in cap 74 which is affixed to diaphragm plate 76 as seen in FIGURE 2. A diaphragm 18 extends across the lower face of plate 76 and is sandwiched at its periphery, in sealing relation, between plate 32 and bell cover 78 of the bell portion 12 of the valve 10. The diaphragm is looped at 18a in the annular space defined by diaphragm plate 76 and bell cover 78 so that the diaphragm may expand and contract. A spring 80 is received around cap 74 with its normal compression being exerted against diaphragm plate 76. The space defined between the diaphragm 18 and plate 32 is the diaphragm chamber 82. A direct connection between diaphragm chamber 82 and gas outlet chamber 38 is provided by tubing 84 which is affixed to fitting 86 at one end to fitting 88 at the other end. Fitting 86 is received in plate 32 and extends into diaphragm chamber 82. Fitting 88 is mounted in the walls 42 defining gas inlet chamber 44. Thus, the pressure of the gas in the diaphragm chamber 82 is the same as that in the gas outlet chamber 38.

When the valve stem 66 is depressed, as shown in FIGURE 3, gas will flow through annular control space 62a, past the outlet portion of orifice 22 into the gas outlet chamber 38. As will be described in more detail hereinafter, the velocity of the gas flowing through orifice 22 is very great so that any non-gaseous matter, such as ice, snow or water condensed from the gas, will be blown downstream into expansion chamber 16, as best seen in FIGURE 1. The non-gaseous matter continues to fall, by force of gravity, into elongated pipe 90 which leads to a condensate tank 92 buried a substantial distance below the surface of the ground 94. Pipe 90 is connected to expansion chamber 16 by means of bolts 96 and nuts 98 sandwiching the respective flanges, 16a and 90a of both elements. Condensate tank 92 is buried in the earth to insulate it from air temperature which may be below freezing so as not to allow the water contained therein to freeze. When the tank is relatively full gate valve 100 may be opened by turning handle 100a which is located above the ground 94 to discharge the water through outlet pipe 102 as best seen in FIGURE 4. Gas which is free from non-gaseous matter in the meantime is discharged through outlet pipe 24 which is located upstream of the gas flow as best seen in FIGURE 2.

*Operation*

The gas flow characteristics of conventional gas expansion valves are shown diagrammatically in FIGURES 5 and 6. In both figures the incoming gas, which is at high pressure, denoted as $P_1$, is reduced to critical pressure, denoted as $P_c$, travelling through the orifice and $P_c$ is further reduced to outlet pressure denoted as $P_3$.

In FIGURE 5, the gas attempts to expand along the converging lines defining the angle $\theta$ but gas from the surrounding region is sucked in as shown by the arrows. Consequently, the expansion takes place along the dotted line.

The angle $\theta$ is an experimental value, 14°. In this case, full velocity is never fully developed for the $P_1$—$P_3$ pressure divergent.

In FIGURE 6, a divergent cone of an angle $\theta$ (less than 14°) is attached to the orifice as shown. The pressure drop $P_1$—$P_3$ is uniform provided the cone is of proper length. The velocity and full pressure drop is developed at the dotted line. Gas is sucked in downstream the dotted line as is shown by the arrows.

FIGURE 7 shows the gas flow characteristics of an expansion valve made in accordance with the present invention. The figure is somewhat diagrammatic in form but illustrates fully the principles upon which the present invention is based.

The orifice, diagrammatically shown at 62, is bored from plug 54. Valve stem 66, which is conical in conformation, is depressed to allow flow of gas. The gas travels along the paths defined by lines X—X and Y—Y. These paths are cones which have an included angle of $\theta_2$, which may be equal to 14°. Gas is sucked in as shown by the arrows z and w, thereby causing the bottom of valve stem 66 to be washed by low velocity or "warm" gas. Additionally, outlet pressure $P_3$ is reached by reducing high pressure $P_1$ without developing full velocity or full temperature drop. Thus the bottoms of plug 54 and valve stem 66 are kept at a higher temperature than the gas travelling through the orifice which tends to minimize freezing of moisture in the gas. Also, the conductive nature of the valve parts transfer heat to the incoming gas to further insure against freezing of the valve parts.

Actual operation of the valve of the present invention is shown in FIGURES 2 and 3. Gas flow is depicted by the arrows shown in FIGURE 2. The gas enters into gas inlet chamber 44 through dust collector 48 which, in turn, is connected to gas inlet pipe 20. The gas, under line pressure, travels into opening 58 of orifice 22, through annular control opening 62a and into gas outlet chamber 38 from whence it is discharged to users into gas outlet pipe 24.

Referring again to FIGURE 2, the force exerted by spring 80 against diaphragm plate 76 (and consequently diaphragm 18) is overcome by the pressure in outlet chamber 38 when no demand is made by the users. Consequently, the gas pressure exerted against diaphragm 18 overcomes the force of spring 80 to pull up shaft 66a to create a tight mating relationship between valve stem 66 and annular lip 62 to prevent the flow of gas through the orifice 22. When a demand is made on the systems by the users, the gas pressure in outlet chamber decreases. This decrease is felt in diaphragm chamber 82 (by means of tubing 84). The compression of the spring overcomes the pressure pushing against the diaphragm 18 and operates to displace shaft 66a and consequently to crack the valve stem 66 to allow flow of gas. The rate of flow of the gas through the annular control space 62a is dependent upon the cross-section of the control space which is in turn controlled by the amount of displacement of valve stem 66.

The non-freezing expansion valve of the present invention is so dimensioned that the velocity of the gas flowing through the orifice 22 is a constant for all rates of flow. That is, the velocity is the same regardless of the cross-sectional area of control space 62a, which, of course, determines the rate of flow. This phenomenon is well known in the art and is termed the critical rate of flow.

It is also well known in the art that natural gas piped from the source to various towns contains a substantial amount of moisture despite efforts by the refiner to dehydrate the gas. It is to be understood that the present invention is not limited for use with natural gas but may be used with any gas that has moisture.

The gas is piped from the gas field to various towns and cities. Large cities are provided with large reduction stations which are enclosed and heated, and thereby are not affected by cold air. Many towns en route, however, are too small to justify erection of large reduction stations. The stations which are erected, called border stations, are small, unheated and usually without electricity. Many of these border stations are located in areas which experience relatively severe winters with attendant drops in temperature below the freezing point of water, 32° Fahrenheit. The conventional reducing valves freeze up in these areas because of the low ambient temperature which does not replenish the energy required to increase velocity of the gas through the valve (and the attendant drop in pressure), which energy is supplied by the gas in the form of a temperature drop.

The expansion valve of the present invention obviates this problem by the unique design of the gas discharge orifice defining cap 22 and the provision of a large expansion chamber 38. When valve stem 66 is cracked to allow gas to flow through control space 62a into outlet chamber 38, the gas rides along annular lip 62 and shoulder 64. As was discussed above, the shoulder 64 presents a sharp enlargement in area to the gas in relation to the narrow cross-section of control space 62a. This sharp enlargement causes turbulence in the gas along the surfaces of the shoulder 64 and the outlet side of the cap 22. The turbulence produces heat which is instrumental in overcoming the effects of the temperature drop in the gas due to increased velocity. The turbulence also sucks in the low velocity gas which is located in the outlet chamber 38. The low velocity gas, which is "warmer" than the gas being emitted from the orifice 22, mixes with same and washes against the surfaces of the orifice. This heat is instrumental in overcoming any tendency of the condensed moisture in the gas to freeze and prevent operation of the valve. If ice does form, the force created by the gas rushing from orifice 22 carries the ice downstream into the expansion chamber 16 from whence it is received in condensate tank 92.

The face of the annular lip 62 should be as small a dimension as possible in order to present a small area in contact with the gas flowing at critical velocity. This gas upon travel through orifice 22 extracts heat therefrom which tends to pre-cool the gas entering openings 58. This pre-cooling is further offset by locating orifice 22 down into outlet chamber 38 and surrounding it with low velocity (warmer) gas.

The gas flowing through orifice 22 into outlet chamber 38 is relatively clean gas and free from impurities, such as ice or condensed water. The gas expands in the expansion chamber 16—that is, increases its volume and decreases its pressure—and is piped for home and industiral use through outlet pipe 24.

In regions of low ambient temperature, the valve unit is preferably heat insulated to minimize loss of heat to the environs and the incident chance of freezing. This is especially true of the portions below sleeve 42 (i.e. chamber 38 and the drain pipes 90 shown in FIGURE 1), where loss of heat may cause freezing of the condensed water and thus block the drain system.

Figure 9:
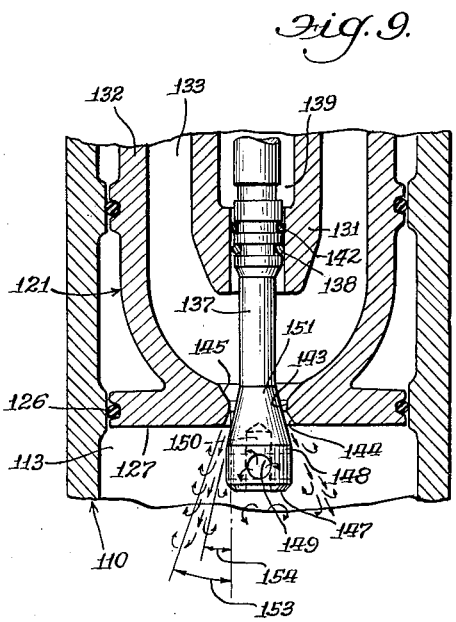
FIGURE 9 is an enlarged view of a portion of the embodiment of FIGURE 8.

The valve of FIGURES 8 and 9 comprises a main valve housing generally 110. Housing 110 has an inlet connecting member 111 defining an inlet passageway 112. The bottom of housing 110 defines an expansion chamber 113. An outlet connecting member 114 defines an oulet passageway 115 communicating with expansion chamber 113. A relief valve connecting member 116 defines a passageway 117 also communicating with expansion chamber 113. A tapped opening 118 provides a pilot fluid connection as hereinafter described.

A valve body generally 121 is received within housing 110. A plurality of pins 122 interconnect housing 110 and body 121 to center the valve body within the housing. A pair of O rings 123 and 124 encircle body 121 and provide fluid-tight seals between the body and the housing. Between O rings 123 and 124 is an inlet chamber 125 between the housing and the body. A third O ring 126 encircles the valve body 121 immediately above the bottom face 127 thereof. Between O rings 124 and 126 is a pilot fluid chamber 128 which communicates with tapped opening 118.

Valve body 121 has an inner, generally cylindrical, valve stem member 131 in the interior thereof. Between valve stem member 131 and the outer wall 132 of valve body 121 is a passageway 133. On opposite sides of the outer wall 132 of valve body 121 are a pair of generally rectangular openings 134 to provide fluid communication between inlet chamber 125 and passageway 133. A stainless steel screen 135 having approximately 1/32 openings and about 50% or more free area encircles the outer cylindrical wall 132 and thus covers both of the two openings 134.

A valve rod 137 extends through valve stem member 131. Adjacent the bottom end of member 131 an O ring 138 is received about valve rod 137 to provide a seal between the valve rod and the valve stem member. Immediately above O ring 138 the interior of valve stem member 131 is enlarged to provide a passageway 139. An opening 140 is drilled through boss 141 which extends between outer wall 132 and valve stem member 131. Opening 140 provides fluid communication between pilot fluid chamber 128 and passageway 139. Between O ring 138 and passageway 139 is groove 142 on rod 137 to receive a grease lubricant for the rod.

Centered in the bottom face 127 of valve body 121 is an opening which defines the valve seat. The walls that define this opening have three distinct faces. The center of the three faces is a cylindrical wall 143. Below cylindrical wall 143 is a truncated, conical wall 144. The bottom portion of the truncated conical wall 144 is rounded off into lower face 127. Above cylindrical wall 143 is an upper truncated, conical wall 145.

The bottom end 147 of valve rod 137 is relatively flat. Immediately thereabove there is a cylindrical portion 148 which has a pair of openings 149 therethrough positioned at right angles to each other. A third opening 150 extends vertically within the valve rod 137, projecting upwardly from the bottom face 147. Immediately above cylindrical portion 148 is a truncated, conical portion 151. Conical portion 151 provides the valve closure member and when the valve is closed, it seats against the lower edge of the cylindrical wall 143 of the valve opening at the circle at which cylindrical wall 143 joins truncated, conical wall 144.

In this structure, there is an orifice which commences at the top of the cylindrical wall 143, i.e. the circle at which the cylindrical wall 143 joins the upper truncated, conical wall 145. The orifice extends downstream to the bottom of the lower truncated, conical wall 144, at which point there is a sharp enlargement defined by the bottom face 127, at which point the orifice opens into the expansion chamber 113. The narrowest point of the orifice is at the circle at which the cylindrical wall 143 joins the lower truncated wall 144. In the disclosed embodiment, this circle is approximately 3/16" above the bottom face 127 of valve body 121. The outside diameter of the orifice should be no larger than one-third the diameter of expansion chamber 113, both measurements being taken parallel to face 127. Another manner of stating the same requirement is that the cross-sectional area of the expansion chamber should be at least nine times the external cross-sectional area of the orifice.

The angle of slope of the outer faces of the truncated, conical portion 151 and truncated conical wall 144 is important. The angle 153 which defines the slope of the tuncated, conical wall 144 should be no greater than about 25°. If it is larger than this, the sharp corner at the bottom of the orifice, at which point the orifice communicates with the expansion chamber 113, is not obtained. Having a sharp enlargement at the bottom of the orifice is important to the obtaining of the proper turbulence within the expansion chamber. Angle 153 should be no smaller than about 2°–30'. The angle 154 which defines the slope of the outer face of the truncated, conical portion 151 must be substantially smaller than the angle 153. Preferably, the difference between angle 153 and angle 154 is about 7° to 14°. If the difference is smaller than about 2°, the valve becomes unstable and pulsates. If the difference is larger than about 20°, the requisite turbulent gas flow in the expansion chamber 113 is not obtained.

In the illustrated embodiment, the upper conical wall 145 is a truncated cone of about 45°. The surface of this truncated cone is a machined surface. This structure is important to prevent droplets of moisture or snow from clinging and accumulating the entrance of the orifice.

Within an enlarged bore 157 at the top of the valve body 121 is a diaphragm support member 158. A spring support member 159 is positioned at the opposite side of the diaphragm 160. Both support members 158 and 159 are received on the end 161 of valve rod 137 and are held in place by a nut 162.

Diaphragm support member 158 abuts against a shoulder 163 with a packing washer 164 being received therebetween. A pair of bores in support member 158 form a passage 165 from the bottom of the support member to a point adjacent the top thereof. An annular groove about the top of body member 121 receives and holds the annular-shaped, enlarged, periphery 160a of diaphragm 160.

The bottom end of a cylindrical spring housing 169 abuts the top of valve body 121 immediately outside of groove 166. A clamping ring 170 is received in an annular groove 171 in spring housing 169. A cylindrical coupling 172 has a flange 173 about the top thereof to hook over the top of ring 170. The bottom of coupling 172 is threaded to engage corresponding threads on the top of housing 110 as indicated at 174. Thus, coupling 172 draws ring 170 and spring housing 169 towards the main valve housing 110 and clamps the valve body 121 between the bottom of spring housing 169 and the top of main valve housing 110.

A cap 176 is threaded into the top of spring housing 169. In turn, a spring reaction rod 177 is threaded into cap 176 and fixed in place by stop nut 178. Threaded onto the lower portion of rod 177 is a traveler 179 having four studs 180 projecting therefrom. Studs 180 are positioned to be received in the spaces between adjacent turns of spring 181. A rotation stopper plate 182 is positioned with its two edges 182a abutting two adjacent studs 180. Plate 182 is wedged by spring action between the two studs 180 and the inner face of housing 169. The frictional engagement thereby obtained prevents any undesired rotation of traveler 179 with respect to rod 177.

Spring reaction rod 177 has an opening extending the length thereof, within which opening is received a valve position indicating rod 185. There is sufficient space in the opening, about rod 185, to permit the ingress and egress of air to and from the chamber formed by spring housing 169. At its lower end, position indicating rod 185 is threaded into the top of valve rod 137. At its upper end the position indicating rod 185 has a plurality of markings 186 which are aligned with a pointer 187 mounted on a stud bolt 188. Stud bolt 188 is threaded into cap 176. Thus, as the valve rod 137 moves up and down into and out of the valve seat, the position thereof with respect to the valve seat is signified by the position of markings 186 with respect to pointer 187.

In operation, the high pressure gas is fed into inlet passageway 112 while passageway 115 delivers the gas at reduced pressure to the city mains or the like. A pilot valve (not shown) connects to the low pressure mains down-stream of passageway 115 and delivers the pilot fluid to tapped opening 118 at a pressure which is a direct function of the gas pressure in the low pressure main. Such structures are conventional in the art and will be readily understood by those skilled in the art without further discussion thereof. In the event that a pilot valve is not used and the disclosed pressure reducing valve is to be self-regulating, tapped opening 118 can be filled with a pipe plug and the use of O ring 126 dispensed with. In that case, the pilot fluid chamber 128 is in communication with expansion chamber 113 because of the space between the bottom of valve body 121 and the inner wall of housing 110.

Assuming that the valve is pilot-operated, the fluid from the pilot valve enters chamber 128, passage 140, passageway 139, passage 165 and the space below diaphragm 160, spring 181 urges the valve rod 137 downwardly, i.e. towards the valve open position. As the pressure on the fluid from the pilot valve increases, that pilot fluid acting against the bottom of the diaphragm urges the valve rod 137 upwardly, compressing spring 181. The compression of spring 181 may be varied by varying the number of active turns in the spring, i.e. the number of turns between spring support member 159 and traveler 179. To change the position of traveler 179 on rod 177, stopper plate 182 is extracted and traveler 179 repositioned on rod 177 so that studs 180 are at a different point along spring 181.

Diaphragm 160 varies in effective area as the valve is opened or closed. For example, in one embodiment the minimum effective area of diaphragm 160 is 11.41 square inches when the valve is fully opened and is 12.37 square inches when the valve is fully closed. One feature that contributes to the obtaining of stable, accurate operation of the disclosed valve is that the pressure of the gas flowing through the orifice, acting on the truncated, conical portion 151 and tending to urge valve rod 137 in the downwardly direction, is balanced by an upward pressure of the gas on O rings 138, urging valve rod 137 in the opposite direction.

The high pressure gas entering passageway 112 flows from chamber 125 through the screen 135 and into chamber 133. Chamber 133 is so shaped that the flow areas thereof (the cross-sectional area measured generally normal to the path of flow of the gas) in the region adjacent the bottom of valve stem member 131 are substantially equal to the cross-sectional area of the intake passageway 112. Thus, there is no increase in velocity with a corresponding drop in temperature until the gas approaches the portion of chamber 133 immediately above the truncated, conical portion 151 and the valve seat entrance defined by the truncated, conical wall 145. Of course, as the gas passes through the space defined by cylindrical wall 143, its velocity is very high and it is extremely cold.

As it leaves the orifice, the fast, cold gas moves in a cone, the two sides of which generally are defined by the adjacent sides of angles 153 and 154. However, since the pressure in expansion chamber 113 is relatively low and because of the abrupt angle between the orifice and the bottom face 127 of valve body 121, there is turbulent flow set up between the fast-moving, cold gas leaving the orifice and the low pressure gas already in chamber 113 and surrounding the cone of fast, cold gas. The low pressure gas, of course, has already become warmed to a substantial extent. Upon coming approximately level with the bottom 147 of valve rod 137, there is a similar turbulent flow set up between the conical stream of cold moving gas and the warmed low pressure gas below the bottom 147 of valve rod 137 within the cone of fast, cold gas.

As in the previously described embodiment, the turbulence thus set up acts to quickly mix the cold, fast-moving gas from the orifice with the warmer low pressure gas already in expansion chamber 113. In addition, the turbulence set up acts to create a flow of low pressure gas in expansion chamber 113 about the bottom of face 127 of valve body 121 and about the bottom 147 of the valve rod. The turbulent movement of low pressure gas will circulate that gas through openings 150 and 149 in the bottom of the valve rod. Since the low pressure gas will have already been warmed to a substantial extent, both as a result of its having lost its velocity and by contact with the walls of valve housing 110 surrounding expansion chamber 113, the low pressure gas actually warms the bottom of the valve rod and the bottom of the valve body 121 to help counteract the chilling of these parts as a result of their contact with the high velocity, extremely cold gas flowing through the orifice.

A further factor in preventing the valves of my invention from freezing is the fact that the outer wall 132 of valve body 121 and the valve stem member 131 are maintained at a relatively warm temperature (as compared to the extreme cold of the high velocity gas passing through the orifice) by reason of the fact that they are surrounded by the high pressure, low velocity gas entering through passageway 112. The upper portions of valve rod 137 similarly tend to be maintained at a comparatively high temperature. By conduction, these parts in turn act to raise the temperature of the portions of the valve body 121 and valve rod 137 defining the orifice.

Also, valve body 121 is, in effect, insulated from the main valve housing 110. The pilot fluid chamber 128 forms a dead air space serving as an insulator. The lower portions of the valve body 121, i.e. the portions immediately above face 127, are spaced from the inner wall of valve housing 110 so that there is no conductive heat transfer therebetween except through O rings 124 and 126, which are of a material that has relatively poor conductive heat transfer characteristics, e.g. synthetic rubber. Thus, to the extent that the portion of valve housing 110 surrounding expansion chamber 113 becomes extremely cold, its heat being given up to the gas within chamber 113, this low temperature of the valve housing 110 does not extract any significant amount of heat by conduction or otherwise from valve body 121.

It has been found that a valve having the structure illustrated in FIGURES 8 and 9 does not condense out sufficient moisture so that it is necessary to utilize a ground tank 92, such as is illustrated in FIGURE 4. To the extent that any moisture may be condensed out, it is almost immediately re-evaporated in the expansion chamber. As a matter of fact, valves of this design operate successfully even though the outlet passageway 115 is positioned at the opposite side of the expansion chamber from the face 127 within which the orifice is positioned.

While I have shown and described specific non-freezing expansion valves embodying the present invention, it will, of course, be understood that various modifications and alternative constructions can be made without departing from the true spirit and scope of the invention. I therefore intend by the appended claims to cover all such alternatives falling within the true spirit and scope thereof.

What I claim as new and desire to secure by Letters Patent of the United States is:

1. A non-freezing expansion valve for gas comprising: valve body means including an orifice member dividing said body into a low pressure chamber and a high pressure chamber, said member having a face at the low pressure chamber side thereof with an opening through the member from said face to the high pressure chamber, said opening being relatively small in size compared to said face, said member forming a constriction in said opening spaced from said face and immediately adjacent the low pressure chamber, said opening tapering outwardly from said constriction to said face, said body means having a tubular guide extending through said guide and said opening and terminating beyond said constriction at the low pressure chamber side of said constriction, said valve stem having a portion corresponding in general cross-sectional configuration to that of the constriction and of greater cross-sectional size than the size of the constriction, said portion being positioned on said stem beyond said constriction at the low pressure side of the constriction, said portion tapering to a smaller cross-sectional dimension toward said constriction to be received in and seat against said constriction, said taper of said portion being a smaller angle than is said taper of said opening; and means connected to the other end of said stem to move said portion of the stem into and out of constriction in response to variations in gas pressure beyond the low pressure side of the constriction; whereby the gas flow from the high pressure chamber through the space between the constriction and the stem, when the two are separated, and into the low pressure chamber will not cause said valve to frost.

2. A non-freezing expansion valve for gas comprising: valve body means including an orifice member dividing said body into a low pressure chamber, and a high pressure chamber, said member having a face at the low pressure chamber side thereof with an opening through the member from said face to the high pressure chamber, said opening being relatively small in size compared to said face, said member forming a constriction in said opening spaced from said face and immediately adjacent the low pressure chamber, said opening tapering outwardly from said constriction to said face, said opening tapering outwardly from said constriction on the high pressure chamber side of said member; an elongated valve stem extending through the high pressure chamber side of said body means and said opening and terminating beyond said constriction at the low pressure chamber side of said constriction, said valve stem having a portion corresponding in general cross-sectional configuration to that of the constriction and of greater cross-sectional size than the size of the constriction, said portion being positioned on said stem beyond said constriction at the low pressure side of the constriction, said portion tapering to a smaller cross-sectional dimension toward said constriction to be received in and seat against said constriction, said taper of said portion being a smaller angle than is said taper of said opening; and means connected to the other end of said stem to move said portion of the stem into and out of the constriction in response to variations in gas pressure beyond the low pressure side of the constriction, whereby the gas flow from the high pressure chamber through the space between the constriction and the stem, when the two are separated, and into the low pressure chamber will not cause said valve to frost.

3. A non-freezing expansion valve for gas having moisture therein, said valve comprising: a valve body means having an orifice member dividing said body into a low pressure chamber and a high pressure chamber, an inlet connection communicating with the high pressure chamber through which said gas under pressure is admitted to the high pressure chamber, an outlet connection communicating with the low pressure chamber for the discharge of the gas at a reduced pressure from the low pressure chamber, said member having a generally plane face at the low pressure chamber side thereof and spaced a distance from the opposite side of the low pressure chamber, said member having a circular opening in said face, normal thereto and communicating with both of the chambers, said member defining a circular portion of minimum diameter in said opening in juxtaposition with said face and spaced a short distance from said face; said member between said minimum diameter portion and said face defining a truncated, conical portion; a valve member having a truncated, conical portion with a large end and a small end, said portion of the valve member being axially received in said opening with the large end on the low pressure chamber side of the minimum diameter portion, said conical portion of said valve member having its sides at a more acute angle than are the sides of the truncated, conical portion of said orifice member, said large end being larger in diameter than said minimum diameter, said valve member having a relatively flat terminus on the low pressure chamber side of the minimum diameter portion; and automatic valve operating means including an elongated member connected to the valve member and extending through at least part of the high pressure chamber, and a means responsive to the gas pressure at the low pressure chamber side of the valve to seat the truncated portion in the minimum diameter portion of the opening when the pressure in the low pressure chamber is in excess of a given value and to move the truncated portion out of the minimum diameter position a distance that is a function of the decrease in the pressure of the low pressure chamber below said given value at which time the high pressure gas issuing from the opening about the truncated portion creates eddy gas circulation of the gas in the low pressure chamber about the terminus of the valve member.

4. An expansion valve comprising: a valve housing having a generally cylindrical internal opening therein with a portion of said internal opening defining an expansion chamber and a second portion defining an inlet chamber, said housing having a high pressure gas connection communicating with said inlet chamber and a low pressure gas connection communicating with said expansion chamber; a generally cylindrical valve body having an external diameter less than the internal diameter of said opening positioned within said opening with the axis of the cylindrical body substantially coincident with the axis of said opening, one end of said body being in said expansion chamber, said body being mounted on said housing at a point spaced from said one end of said body, said body having an internal opening communicating with said inlet chamber; sealing means between said housing and said body and positioned to isolate the inlet chamber from the expansion chamber, said means being formed of a material having a relatively low rate of heat conduction as compared with said housing and body; orifice means extending through said one end of said body between said internal opening therein and said expansion chamber, said orifice defining a truncated, conical portion opening into said expansion chamber; and a valve member having a truncated, conical portion with a large end and a small end, said portion of said valve member being received in said orifice with the large end disposed toward said expansion chamber, said conical portion of said valve defining a more acute included angle than the included angle defined by the conical portion of said orifice, said valve and orifice control assembly adapted, upon operation, to release high pressure gas from said opening in said body in a hollow, conical high pressure stream with the outer sides of the cone being no greater than about 50° apart and the angle defining the thickness of the stream between the inner and outer sides thereof being less than about 20° and more than about 2° to create a turbulent flow of low pressure gas in said expansion chamber to mix with the stream of high pressure gas from said body opening.

5. In a regulated expansion valve comprising an inlet chamber and an expansion chamber in which gas flows from the inlet chamber to the expansion chamber, the improvement comprising: a valve seat member positioned between the inlet chamber and the expansion chamber, said member defining an opening through which said gas flows, said opening having a constriction in a plane immediately upstream from said expansion chamber, said opening being flared outwardly at substantially a given angle in the portion of said opening between said constriction and said expansion chamber; and a valve closure member received in said constriction with the longitudinal axis of the closure member normal to said plane, said closure member having a relatively flat terminus normal to said axis and downstream of said constriction, at least a portion of said closure member between said plane and said terminus being flared outwardly at less than said given angle, the part of said closure member downstream of said plane being larger than said constriction, said closure member being mounted for movement axially thereof.

6. In a regulated expansion valve comprising an inlet chamber and an expansion chamber in which gas flows from the inlet chamber to the expansion chamber the improvement comprising: a valve seat member positioned between the inlet chamber and the expansion chamber, said member having a substantially flat face on the expansion chamber side thereof, said member defining an opening normal to said face for the flow of gas from said inlet chamber to said expansion chamber, the dimensions of said opening as measured parallel to said face being less than one-third the corresponding dimension of said face, said opening having a constriction in a plane parallel to said face and positioned immediately upstream from said face, said opening being flared outwardly at substantially a given angle in the portion of the opening between said constriction and said face, said opening being flared outwardly upstream from said constriction; and a valve closure member received in said constriction with the longitudinal axis of the closure member normal to said plane, said closure member having a terminus downstream of said constriction, at least a portion of said closure member between said plane and said terminus being flared outwardly at less than said given angle, the part of said closure member downstream of said plane being larger than said constriction, said closure member being mounted for movement axially thereof.

7. In a regulated expansion valve comprising an inlet chamber and an expansion chamber in which gas flows from the inlet chamber to the expansion chamber the improvement comprising: a valve seat member positioned between the inlet chamber and the expansion chamber, said member having a substantially flat face on the expansion chamber side thereof, said member defining an opening normal to said face for the flow of gas from said inlet chamber to said expansion chamber, the dimensions of said opening as measured parallel to said face being less than one-third the corresponding dimension of said face, said opening having a constriction in a plane parallel to said face and positioned immediately upstream from said face, said opening having its sides flared outwardly at an angle of less than about 25° and more than about 2°–30′ in the portion of the opening between said constriction and said face; and a valve closure member received in said constriction with the longitudinal axis of the closure member normal to said plane, said closure member having a terminus downstream of said constriction, at least a portion of said closure member between said plane and said terminus being flared outwardly at an angle that is at least 2° smaller than the angle of flare of said sides of said opening, the part of said closure member downstream of said plane being larger than said constriction, said closure member being mounted for movement axially thereof.

References Cited in the file of this patent

UNITED STATES PATENTS

| | | |
|---|---|---|
| 369,467 | Pattrell | Sept. 6, 1887 |
| 1,493,409 | Wiley | May 6, 1924 |
| 1,793,019 | Sawyer | Feb. 17, 1931 |
| 1,911,561 | Fitts | May 30, 1933 |
| 2,219,324 | Lee | Oct. 29, 1940 |
| 2,452,956 | Robins | Nov. 2, 1948 |
| 2,545,787 | Leach | Mar. 20, 1951 |
| 2,770,443 | Rand | Nov. 13, 1956 |
| 2,816,569 | Heyer | Dec. 17, 1957 |
| 2,821,356 | Rand | Jan. 28, 1958 |

FOREIGN PATENTS

| | | |
|---|---|---|
| 803 | Great Britain | of 1896 |